(12) United States Patent
Hirai et al.

(10) Patent No.: US 6,574,054 B2
(45) Date of Patent: Jun. 3, 2003

(54) STRUCTURAL UNIT AND METHOD OF FIXING A LENS AND A SOLID STATE IMAGING ELEMENT

(75) Inventors: Ryohji Hirai, Sagamihara (JP); Yoshihiro Morii, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/983,622

(22) Filed: Oct. 25, 2001

(65) Prior Publication Data

US 2002/0051305 A1 May 2, 2002

(30) Foreign Application Priority Data

Oct. 26, 2000 (JP) ........................................ 2000-326856

(51) Int. Cl.[7] ................................................ G02B 7/02
(52) U.S. Cl. ....................................................... 359/819
(58) Field of Search ................................. 359/811, 819

(56) References Cited

U.S. PATENT DOCUMENTS

| 4,493,573 A | 1/1985 | Hashimoto et al. ...... 400/647.1 |
| 4,795,284 A | 1/1989 | Yumoto et al. ............ 400/352 |
| 4,846,595 A | 7/1989 | Kato et al. .................. 400/320 |
| 5,377,038 A | * 12/1994 | Uzuki et al. ................. 359/205 |
| 5,673,136 A | * 9/1997 | Inoue et al. ................. 359/205 |
| 5,758,950 A | * 6/1998 | Naoe et al. ................. 362/259 |
| 5,805,363 A | * 9/1998 | Okuda et al. ............... 359/800 |
| 5,953,042 A | * 9/1999 | Nabeta et al. .............. 347/257 |
| 6,000,784 A | 12/1999 | Takemoto et al. ........... 347/50 |
| 6,127,012 A | 10/2000 | Nagatsuna et al. ........ 428/40.1 |
| 6,217,684 B1 | 4/2001 | Morii et al. .................. 156/64 |
| 6,224,709 B1 | 5/2001 | Takemoto et al. ....... 156/275.5 |

FOREIGN PATENT DOCUMENTS

| JP | 404253012 A | * 8/1992 | ........... G02B/07/00 |
| JP | 07-297997 | 11/1995 | |
| JP | 10-309801 | 11/1998 | |

* cited by examiner

*Primary Examiner*—Ricky Mack
(74) *Attorney, Agent, or Firm*—Oblon, Spivak, McClelland, Maier & Neustadt, P.C.

(57) ABSTRACT

A structural unit includes a lens that forms an optical image, a solid state imaging element placed in a predetermined position relative to the lens, and an intermediary supporting member that may be bonded and fixed to each of the lens and the solid state imaging element by an adhesive. Thereby, the lens and the solid state imaging element can be integrated with each other in a state that a positional relation between the lens and the solid state imaging element is maintained.

19 Claims, 4 Drawing Sheets

STRUCTURAL UNIT AND METHOD OF FIXING A LENS AND A SOLID STATE IMAGING ELEMENT

BACKGROUND OF THE INVENTION

1. Field of the Invention

The present invention relates to a structural unit and a method of fixing a lens that forms an optical image and a solid state imaging element that photo-electrically converts the optical image into electrical signals, and in particular relates to a structural unit and a method of fixing a lens and a solid state imaging element, which require a relatively high accuracy in fixing of the lens and the solid state imaging element and which require an adjustment in positioning thereof.

2. Discussion of the Background

In image reading apparatuses that read an image as an optical image using a lens and a solid state imaging element such as a CCD (charge-coupled device), the solid state imaging element (hereinafter sometimes referred to as a CCD) must be precisely placed at a position where a line image is formed by the lens. That is, for precisely reading an image with predetermined optical characteristics of the lens (e.g., focusing, magnification characteristics, etc.), precise adjustment of the relative position of the lens and the CCD is required. At the same time, it is necessary to fix each of the lens and the CCD with relatively high accuracy with minimal positional deviation, after adjustment of respective positions of the lens and the CCD.

Conventionally, screws have been used in fixing a CCD and a lens. When screws are used in fixing a CCD and a lens, generally, positional deviation of from several hundreds mm to several tens μm is observed in the position of the CCD relative to the lens.

Japanese Patent Laid-open Publication No. 5-328017 describes a method of using a relatively complicated mechanism including an arrowhead, a ball, a spring, etc., instead of screws. The number of parts of the mechanism is relatively large and consequently the cost of the mechanism is relatively high.

Therefore, recently, a method of using an adhesive agent has been attempted for fixing a CCD and a lens, in which positional deviation with respect to the CCD and the lens and the number of parts used in fixing are relatively small as compared with the method of using screws in fixing the lens and the CCD.

As a method of fixing a CCD and a lens with an adhesive agent, a method referred to as filling bonding is known, as described for example in Japanese Patent Laid-open Publication No. 7-297993.

In the filling bonding method, a gap greater than an adjusting margin for positional adjustment is provided between members to be bonded, and an adhesive agent is filled in the gap so that the members are bonded together with the adhesive agent. In the method, the amount of the gap is set such that the members to be bonded together will not contact each other even when the shapes of the members are varied from the designed shapes. For the adhesive agent, an adhesive material that becomes rigid by ultraviolet light in a short time, about 5 seconds, is used to provide high productivity.

However, the volume contraction percentage of an adhesive agent that becomes rigid by ultraviolet light when the adhesive agent becomes rigid is generally about from 5% to 10%. If the volume contraction percentage is 7%, when the shape of the hardened adhesive agent is a cube, the cube-shaped adhesive agent contracts about 2% in each of the three-dimensional directions thereof. Accordingly, in the filling bonding method, when the thickness of the adhesive agent for bonding members to be bonded together is relatively large, for example, about 1 mm, contraction of about 2%, i.e., a positional deviation of about 20 μm, occurs in each of the three dimensional directions. This contraction causes a positional deviation in the members to be bonded together when the members are fixed. Thus, the filling bonding method cannot be applied in fixing a CCD and a lens in a CCD lens unit that requires a relatively high accuracy, e.g., a positional deviation of about 20 μm or smaller, in fixing the CCD and the lens.

Japanese Patent Laid-open Publication No. 10-309801 describes a method that realizes a relatively high accuracy in fixing members using an adhesive agent. JP No. 10-309801 relates to a structure to mount an ink jet printing head to a head supporting member with high accuracy. In the mounting structure, an intermediary mounting member is arranged between the ink jet printing head and the head supporting member, and the intermediary supporting member is fixed to the ink jet printing head by an adhesive agent, and at the same time, to the head supporting member as well via the adhesive agent.

In the above-described structure, the volume contraction of an adhesive agent occurring when the adhesive agent is hardened is converted only to a movement of the intermediary support member to be attached by the adhesive agent, so that positional deviation in other parts, e.g., in the ink jet printing head, is avoided.

The applicant of the present invention has previously proposed to apply the above-described structure of JP No. 10-309801 to a CCD lens unit including a CCD and a lens, in which the CCD and a CCD supporting member are bonded together via an intermediary supporting member. The number of parts in the proposed CCD lens unit is small as compared with the mechanism of JP No. 5-328017 including an arrowhead, etc. However, besides the CCD and the lens, parts for supporting or fixing the CCD and the lens are still needed, such as the intermediary supporting member for supporting the CCD, a lens housing tube for housing and supporting the lens and a pressing plate for fixing the tube, and a supporting member for supporting the intermediary supporting member and the lens housing tube.

SUMMARY OF THE INVENTION

The present invention has been made in view of the above-discussed and other problems and addresses the above-discussed and other problems.

Preferred embodiments of the present invention provide a novel structural unit and a method for fixing a solid state imaging element and a lens, which realize a relatively high accuracy in fixing the solid state imaging element and the lens and at the same time realizes a significant reduction in the number of parts used in fixing the solid state imaging element and the lens.

Other preferred embodiments of the present invention provide a structural unit for fixing a solid state imaging element and a lens, in which the positional adjustment with respect to the solid state imaging element and the lens can be performed in 5 axial directions.

According to a preferred embodiment of the present invention, a structural unit includes a lens that forms an optical image, a solid state imaging element placed in a predetermined position relative to the lens, and an intermediary supporting member that may be bonded and fixed to each of the lens and the solid state imaging element by an adhesive so that the lens and the solid state imaging element are integrated with each other in a state that a positional relation between the lens and the solid state imaging element is maintained. In this configuration, because the intermediary supporting member is bonded and fixed to each of the lens and the solid state imaging element by the adhesive so that the lens and the solid state imaging element are integrated with each other in a state that a positional relation between the lens and the solid state imaging element is maintained, the effect of contracting of the adhesive when the adhesive is hardened is absorbed by the movement of the intermediary member, so that the lens and the solid state imaging element are fixed with relatively high accuracy. Further, by bonding each of the lens and the solid state imaging element to the intermediary supporting member, various parts that are generally required for fixing the solid state imaging element and the lens, e.g., a lens supporting member, a lens housing tube, a lens pressing plate, and screws for fastening the pressing plate, etc., which are used in some background structural units, are not required.

The unit may further include a mounting part provided to one of the lens and the solid state imaging element and configured to mount the unit to an apparatus. The mounting part may be configured to function as a reference for mounting the unit to the apparatus.

In the above-described unit, each bonding surface of the lens, the solid state imaging element, and the intermediary supporting member may be flat.

Further, the bonding surface of the lens may be in parallel to an optical axis of the lens, and the bonding surface of the solid state imaging element may be perpendicular to the optical axis of the lens. In this configuration, by sliding the bonding surface of the lens, the positional adjustments for the lens and the solid state imaging element can be performed in three directions, i.e., the x-coordinate direction (the main scanning direction), the z-coordinate direction (the optical axis direction), and the γ direction (the rotation direction around the z-coordinate). Similarly, by sliding the bonding surface of the solid state imaging element, the positional adjustments for the lens and the solid state imaging element can be performed in three directions, i.e., the x-coordinate direction (the main scanning direction), the y-coordinate direction (the sub-scanning direction), and the β direction (the rotational direction around the z-coordinate). Thus, in this configuration, the positional adjustments for the lens and the solid state imaging lens can be performed in 5 axial directions.

Furthermore, the adhesive may be an adhesive that becomes rigid in response to ultraviolet light. Because the hardening time of such an adhesive is relatively short, the time required for producing the structural unit can be reduced.

Still further, the intermediary supporting member may be made of a material that passes the ultraviolet light. This configuration allows the adhesive arranged between the intermediary supporting member and the lens and the solid state imaging element to be uniformly, quickly, and efficiently hardened.

Furthermore, the mounting part provided to the lens may include a parallel mounting plane that is in parallel with the optical axis of the lens, a perpendicular mounting plane that is perpendicular to the optical axis, and a mounting plane that is perpendicular to both of the parallel mounting plane and the perpendicular mounting plane. This configuration enables positioning of the structural unit in three axial directions and thereby positioning the structural unit relative to the mounting apparatus.

Still furthermore, the mounting part provided to the lens may include a mounting plane that is parallel with the bonding surface of the lens and a through hole perpendicularly passing through the bonding surface of the lens and the mounting plane of the mounting part that is parallel with the bonding surface. This configuration allows the lens to be used as a reference in mounting the structural unit in an apparatus.

According to another preferred embodiment of the present invention, a method of fixing a lens and a solid state imaging element to be placed in a predetermined position relative to the lens includes the steps of individually grasping the lens and the solid state imaging element and positioning the solid state imaging element in the predetermined position relative to the lens. Hardening adhesives are placed between each bonding surface of the lens and the solid state imaging element and a bonding surface of an intermediary supporting member that is in a free condition in a state that the solid state imaging element and the lens are maintained in respective positions after the solid state imaging element has been positioned in the predetermined position relative to the lens. The intermediary supporting member in the free condition is supported by respective surface tensions of the adhesives placed between the bonding surfaces of the lens, the solid state imaging lens, and the intermediary supporting member.

The method may further include the step of providing a mounting part for mounting the lens and the solid state imaging element to an apparatus to one of the lens and the solid state imaging element.

Further, the method may include the step of forming each of bonding surfaces of the lens, the solid state imaging element, and the intermediary supporting member to be flat.

Furthermore, the method may further include the step of placing the bonding surface of the lens in parallel to an optical axis of the lens, and placing the bonding surface of the solid state imaging element perpendicular to the optical axis of the lens.

Still furthermore, in the method, the step of hardening the adhesives may include the step of using an adhesive that becomes rigid in response to ultraviolet light. Further, the step of hardening the adhesives may include the step of using an intermediary supporting member that passes ultraviolet light.

Furthermore, the mounting part providing step may further include the step of providing the mounting part to the lens, wherein the mounting part may include a parallel mounting plane in parallel with the optical axis of the lens, a perpendicular mounting plane perpendicular to the optical axis, and a mounting plane perpendicular to both of the parallel mounting plane and the perpendicular mounting plane. The mounting part may further include a mounting plane parallel with the bonding surface of the lens, and a through hole that perpendicularly passes through the bonding surface of the lens and the mounting plane of the mounting part in parallel with the bonding surface of the lens.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Figure 1:
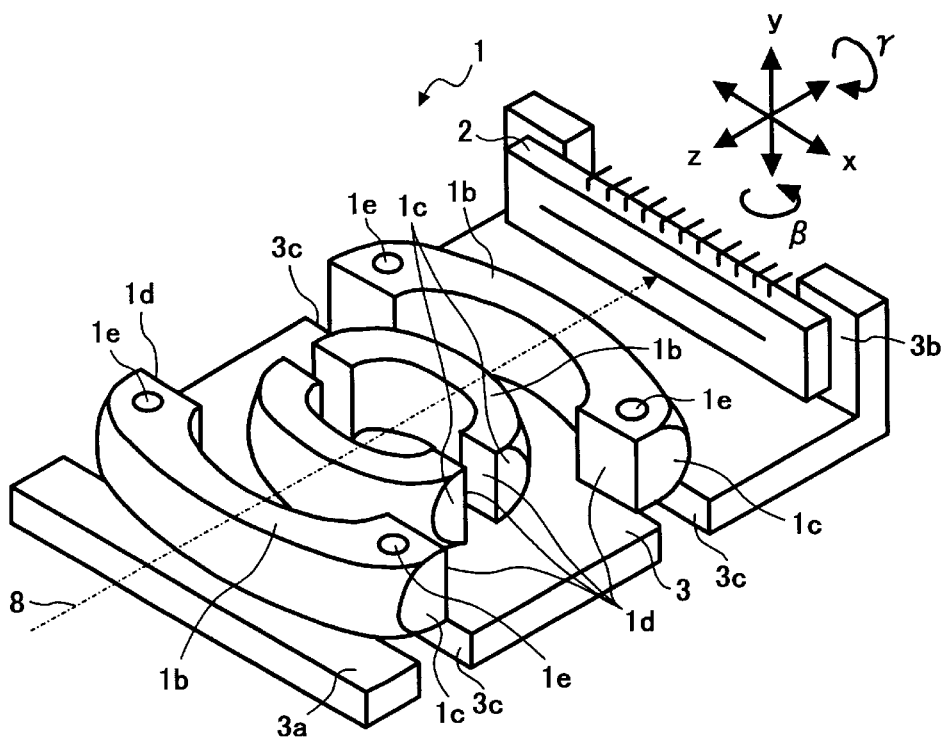
FIG. 1 is a perspective view illustrating a structural unit fixing a lens and a CCD according to a preferred embodiment of the present invention.

Referring now to the drawings, wherein like reference numerals designate identical or corresponding parts throughout the several views, preferred embodiments of the present invention are described.

Figure 2:
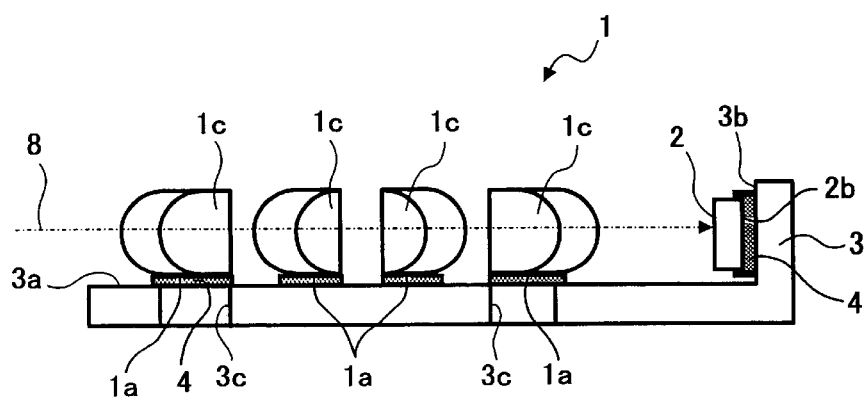
FIG. 2 is a side view of the structural unit of FIG. 1.

FIG. 1 is a perspective view and FIG. 2 is a side view illustrating a structural unit fixing a lens and a CCD according to a preferred embodiment of the present invention.

As illustrated in FIG. 1 and FIG. 2, an image reading apparatus as an example of the structural unit fixing a lens and a CCD includes a series of lenses 1 constituting an image forming lens for forming an optical image (hereinafter referred to simply as the lens 1), a CCD 2 for photo-electrically converting the optical image into electrical signals as an example of a solid state imaging element, and an intermediary supporting member 3 for supporting the CCD 2 at a predetermined position relative to the lens 1. The intermediary supporting member 3 is fixed by an adhesive to the lens 1 and the CCD 2.

The lens 1 has a flat bonding surface 1a, a plane 1b parallel to an optical axis 8, a plane 1c perpendicular to the plane 1b and parallel to the optical axis 8, a plane 1d perpendicular to both of the planes 1b and 1c, and a mounting hole 1e. The CCD 2 has a flat bonding surface 2b at a back side thereof.

The intermediary supporting member 3 can be formed in an L-like shape in its side view, and includes a flat bonding surface 3a serving as a horizontal flat surface for bonding the flat bonding surface 1a of the lens 1, a flat bonding surface 3b serving as a perpendicular plane for bonding the flat bonding surface 2b of the CCD 2, and a notch 3c. The intermediary supporting member 3 can be made of a material that passes ultraviolet light, e.g., glass.

In FIG. 1, numeral 8 represent the optical axis and corresponds to the z-coordinate direction. The x-coordinate direction corresponds to the main scanning direction in the image reading apparatus, and the y-coordinate direction corresponds to the sub-scanning direction.

As illustrated in FIG. 1, the positional adjustments in 5 axial directions, i.e., x, y, z, γ, and β directions, that are required for reading an image with a predetermined optical characteristic of the lens 1 are performed by adjustment of the CCD 2. The adjustments in the 5 axial directions are performed, as illustrated in FIG. 2, in a state that the intermediary supporting member 3 is supported so as to be in a free condition by a surface tension of an adhesive agent 4 arranged between the flat bonding surface 3a of the intermediary supporting member 3 and the flat bonding surface 1a of the lens 1, and that of the adhesive agent 4 arranged between the flat bonding surface 3b of the intermediary supporting member 3 and the flat bonding surface 2b of the CCD 2. For the adhesive agent 4, an adhesive agent that becomes rigid by ultraviolet light can be used.

Figure 3:
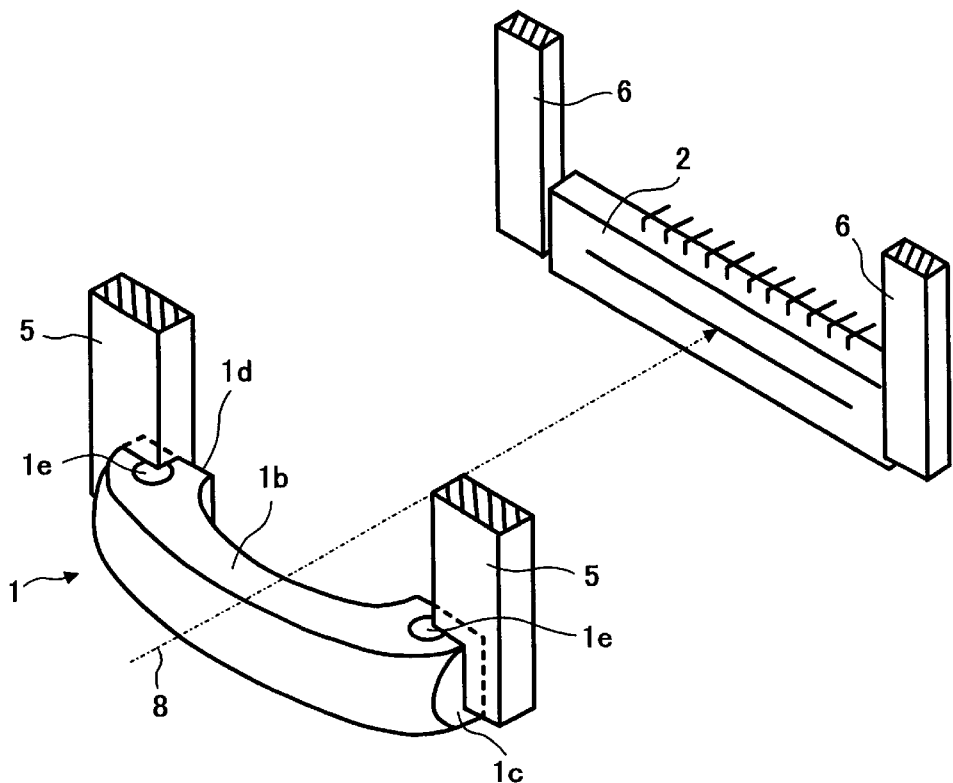
FIG. 3 is a schematic drawing for explaining adjustment of a CCD relative to a lens according to a preferred embodiment of the present invention.
Figure 4:
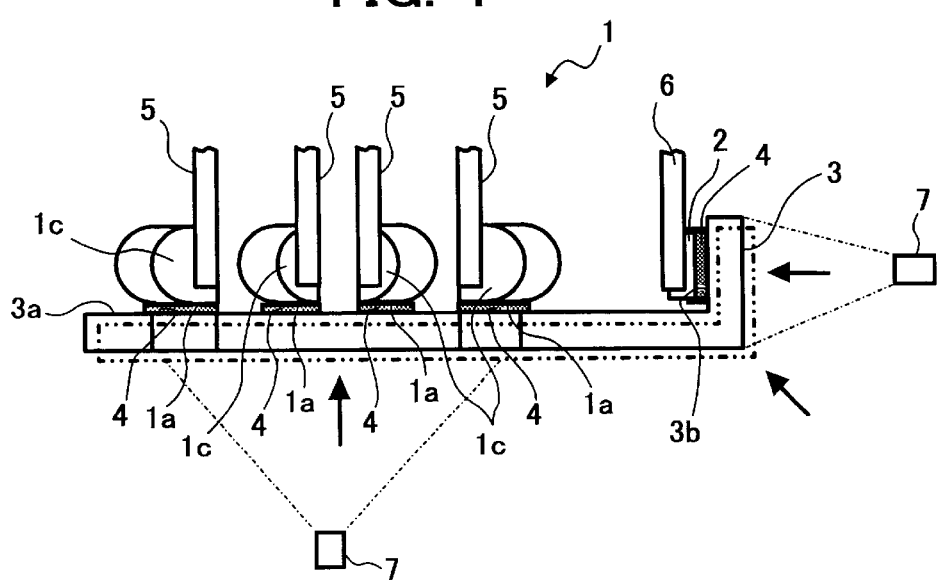
FIG. 4 is a cross-section for explaining hardening of an adhesive agent arranged between an intermediary supporting member and a lens and a CCD.

FIG. 3 is a schematic drawing for explaining adjustment of the CCD 2 relative to the lens 1 according to a preferred embodiment of the present invention. FIG. 4 is a cross-section for explaining hardening of the adhesive agent 4.

As illustrated in FIG. 3, the lens 1 is supported by chucks 5 of an adjusting apparatus by being grasped by the chucks 5, and the CCD 2 is supported by chucks 6 of the adjusting apparatus by being grasped by the chucks 6. At this time, the lens 1 is supported by the chucks 5 with the planes 1b, 1c, and 1d thereof press-contacted to the chucks 5, and the CCD 2 is supported by the chucks 6 with the front, upper, and side surfaces thereof pressed-contacted to the chucks 6.

Further, as illustrated in FIG. 4, the intermediary supporting member 3 in a free condition is supported as described above by the lens 1 and the CCD 2 via a surface tension of the adhesive agent 4. In this state, according to an electrical signal from the CCD 2, the position of the CCD 2 relative to the lens is adjusted to a predetermined position.

After the adjustment, as illustrated in FIG. 4, while stabilizing the chucks 6 in the state wherein the position of the CCD 2 relative to the lens 1 is in the predetermined position, an ultraviolet light 7 is irradiated toward the adhesive agent 4, so that the adhesive agent 4 is hardened, and thereby the positions of the lens 1 and the CCD 2 relative to the intermediary supporting member 3 are fixed.

When the adhesive agent 4 is hardened, due to contraction of the adhesive agent 4, as illustrated in FIG. 4, the intermediary supporting member 3 moves so as to be closer to the lens 1 and the CCD 2. Thus, the effect of contracting of the adhesive agent 4 when the adhesive agent 4 is hardened is absorbed by the movement of the intermediary supporting member 3. That is, the lens 1 and the CCD 2 remain in their positions, and the intermediary supporting member 3 moves as the adhesive agent 4 hardens and thereby contracts. Thereby, the positional deviation between the lens 1 and the CCD 2 due to the contracting force of the adhesive agent 4 when the adhesive agent 4 is hardened is suppressed, and the lens 1 and the CCD 2 are positioned with high accuracy. In FIG. 4, the position of the intermediary supporting member 3 before the adhesive agent 4 is hardened and contracted is illustrated by a chain line and the position of the intermediary supporting member 3 after having been moved due to the contraction of the adhesive agent 4 is illustrated by a solid line.

Figure 5:
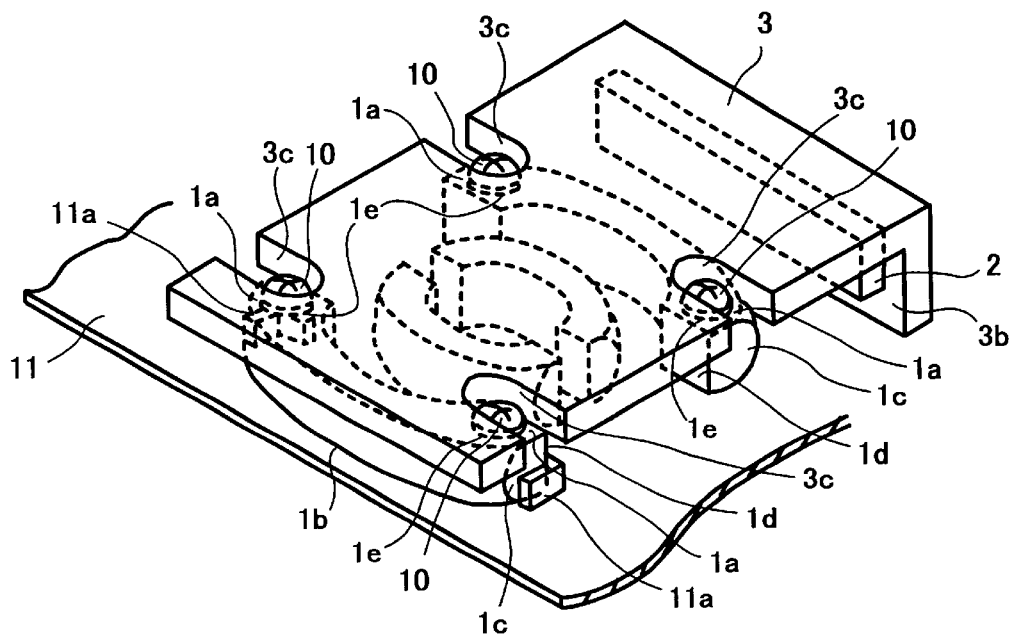
FIG. 5 is schematic drawing for explaining mounting of the unit of FIG. 1 to an apparatus.

FIG. 5 is schematic drawing for explaining mounting the above-described structural unit to an apparatus.

As illustrated in FIG. 5, an image reading apparatus constituted by the lens 1, the CCD 2, and the intermediary supporting member 3 that are positioned and integrated with each other is fixed to a mounting side apparatus 11, for example a scanner unit. The plane 1b of the lens 1 is pressed against a plane of the mounting side apparatus 11 and the planes 1c and 1d of the lens 1 are pressed against an L-like shaped positioning member 11a of the mounting side apparatus 11, which is a reference member of the mounting side apparatus 11, so that the lens 1 is positioned, and then, the image reading apparatus is fixed to the mounting side apparatus 11 with screws 10 via the mounting holes 1e. In FIG. 5, symbol 3c denotes a notch forming a clearance for the screw 10. The notch 3 can be a through hole.

Figure 6:
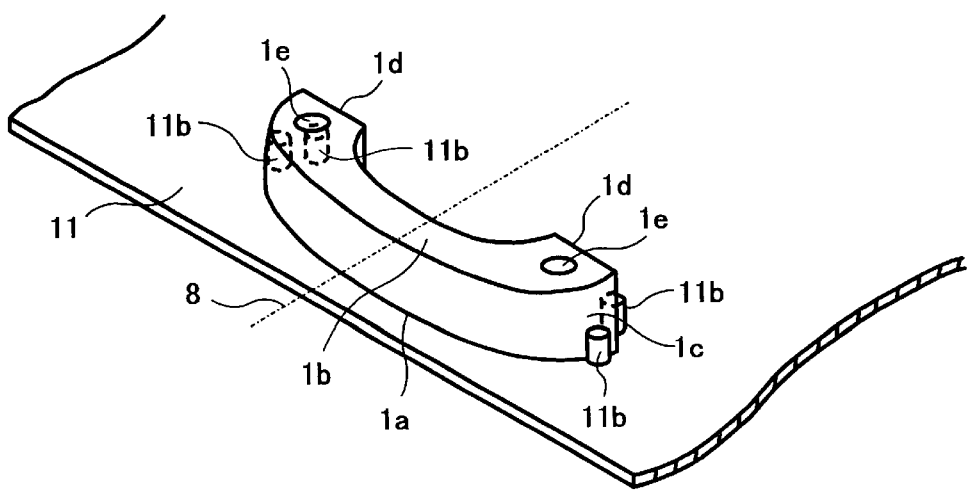
FIG. 6 is a diagram illustrating another example of a positioning member of the mounting side apparatus of FIG. 5.

FIG. 6 is a diagram illustrating another example of the positioning member 11a of the mounting side apparatus 11. As illustrated in FIG. 6, a cylinder type positioning member 11b can be provided instead of the L-like shaped positioning member 11a.

Figure 7:
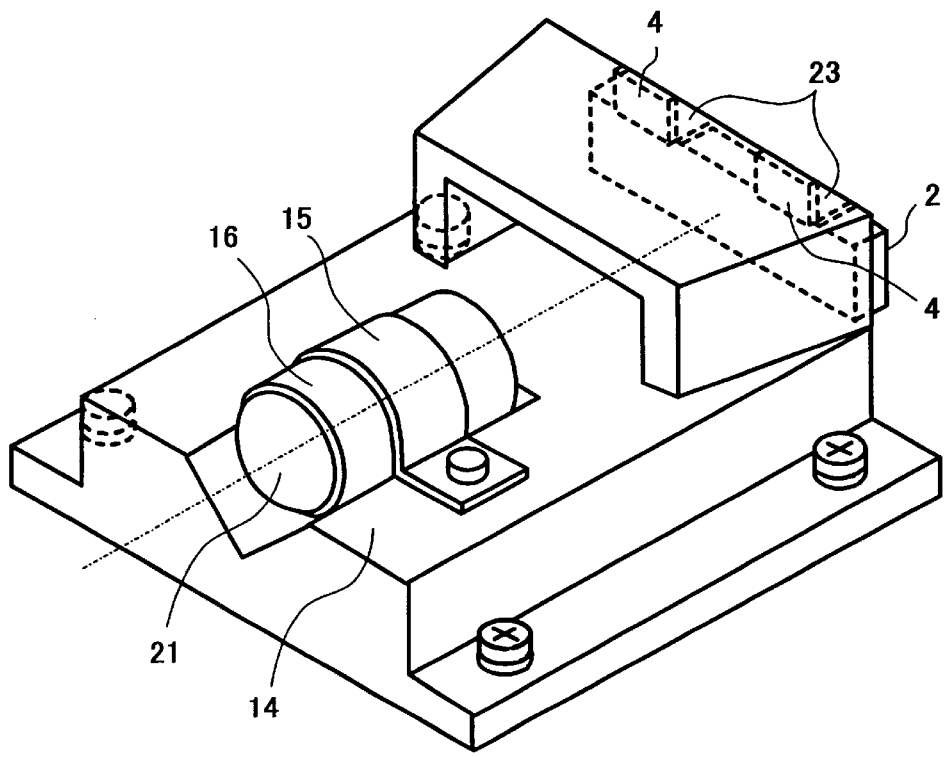
FIG. 7 is a perspective view of a background image reading apparatus.
Figure 8:
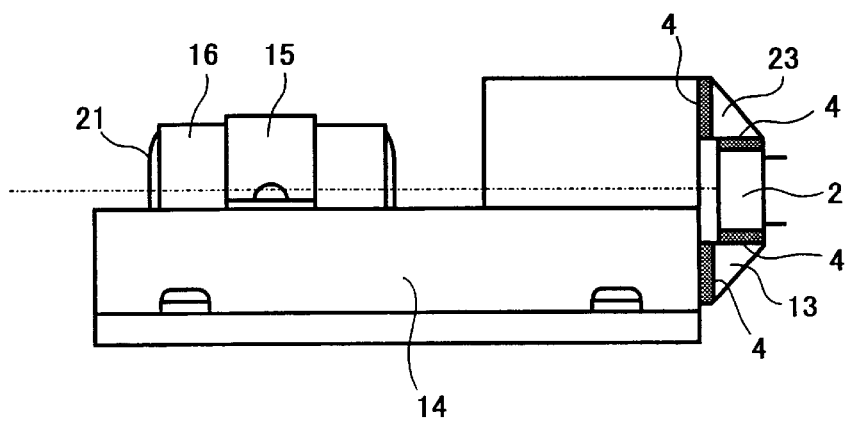
FIG. 8 is a side view of the background apparatus of FIG. 7.

FIG. 7 is a perspective view of a background image reading apparatus, and FIG. 8 is a side view of a background image reading apparatus.

In FIGS. 7 and 8, numeral 14 denotes a lens supporting member, in which a V-shaped groove is formed, and a lens tube 16 mounting a lens 21 is positioned in the V-shaped groove. The lens 21 images an image of an original document on each of picture element lines provided for R, G, and B of the CCD 2. The lens 21 is fixed by a pressing plate 15. Numeral 23 denotes a background intermediary supporting member.

As described above, in a structural unit of a lens and a solid state imaging element according to a preferred embodiment of the present invention, an intermediary supporting member in a free condition is arranged between the lens and the solid state imaging element, and is supported by a surface tension of an adhesive agent arranged between the intermediary supporting member and the lens and the solid state imaging element, and the adhesive agent is hardened after the positions of the lens and the solid state imaging element are adjusted. Therefore, the effect of the adhesive agent contracting when the adhesive agent is hardened is absorbed by the movement of the intermediary supporting member, so that the positions of the lens and the solid state imaging element are not effected by the contraction of the adhesive agent.

Further, in the present invention because the lens is directly bonded to the intermediary supporting member, the lens supporting member 14, the lens housing tube 16, and the lens pressing plate 15, which are required in the background image reading apparatus as illustrated for example in FIGS. 7 and 8, are not required. Thereby, the structural unit of the present invention is inexpensive.

Further, in the present invention the lens includes three planes for mounting the lens to an apparatus. Therefore, the structural unit of the present invention can be mounted to and positioned in the apparatus without affecting the position of the lens, and substantially the same effects that are obtained by the lens supporting member 14 of the background image reading apparatuses in supporting and positioning of the lens can be obtained.

Furthermore, because in the present invention the structural unit includes the mounting holes 1e, the structural unit of the present invention can be fixed to the apparatus by screws without affecting the position of the lens.

In the above-described embodiment, the intermediary supporting member 3 is configured to be adjusted in a state that the intermediary supporting member 3 is supported by the lens and the CCD 2 via a surface tension of the adhesive agent 4. However, the intermediary supporting member 3 may be configured such that after positional adjustment is performed, the adhesive agent 4 is adhered onto a bonding surface of the intermediary supporting member 3 to be supported via a surface tension of the adhesive agent 4 and then the adhesive agent 4 is hardened.

Further, the description has been made with respect to a case wherein the mounting part for mounting the structural unit to an apparatus is provided to the lens. However, the mounting part can be provided to the solid state imaging element.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Application No. 2000-326856 filed in the Japanese Patent Office on Oct. 26, 2000, and the entire contents of which are hereby incorporated herein by reference.

What is claimed is:

1. A structural unit comprising:
   a lens configured to form an optical image;
   a solid state imaging element placed in a predetermined position relative to the lens;
   an intermediary supporting member configured to be bonded and fixed to each of the lens and the solid state imaging element by an adhesive so that the lens and the solid state imaging element are integrated with each other in a state that a positional relation between the lens and the solid state imaging element is maintained; and
   a mounting part provided to one of the lens and the solid state imaging element and configured to mount the structural unit to an apparatus.

2. The structural unit of claim 1,
   wherein the mounting part is provided to the lens and includes a mounting plane parallel with the bonding surface of the lens and a through hole passing through the bonding surface of the lens and the parallel mounting plane of the mounting part.

3. The structural unit of claim 1,
   wherein the mounting part is configured to function as a reference for mounting the structural unit to the apparatus.

4. The structural unit of claim 1,
   wherein each of a bonding surface of the lens, a bonding surface of the solid state imaging element, and a bonding surface of the intermediary supporting member are flat.

5. The structural unit of claim 4,
   wherein the bonding surface of the lens is parallel to an optical axis of the lens, and
   wherein the bonding surface of the solid state imaging element is perpendicular to the optical axis of the lens.

6. The structural unit of claim 1,
   wherein the adhesive becomes rigid in response to ultraviolet light.

7. The structural unit of claim 6,
   wherein the intermediary supporting member passes the ultraviolet light.

8. The structural unit of claim 1,
   wherein the mounting part is provided to the lens and includes a parallel mounting plane parallel with an optical axis of the lens, a perpendicular mounting plane perpendicular to the optical axis of the lens, and a mounting plane perpendicular to both of the parallel mounting plane and the perpendicular mounting plane.

9. A method of fixing a lens and a solid state imaging element to be placed in a predetermined position relative to the lens, the method comprising:
   grasping the lens and the solid state imaging element and positioning the solid state imaging element in the predetermined position relative to the lens;

hardening adhesives placed between bonding surfaces of the lens and the solid state imaging element and a bonding surface of an intermediary supporting member that is in a free condition in a state that the solid state imaging element and the lens are maintained in respective positions after the solid state imaging element has been positioned in the predetermined position relative to the lens, wherein the intermediary supporting member in the free condition is supported by respective surface tensions of the adhesives placed between the boding surfaces of lens, the solid state imaging element, and the intermediary supporting member; and providing a mounting part configured to mount the lens and the solid state imaging element to an apparatus.

10. The method of claim 9, wherein the providing a mounting part includes providing the mounting part to the lens, the mounting part including a parallel mounting plane parallel with the optical axis of the lens, a perpendicular mounting plane perpendicular to the optical axis, and a mounting plane perpendicular to both of the parallel mounting plane and the perpendicular mounting plane.

11. The method of claim 9, wherein the providing a mounting part includes providing the mounting part to the lens, the mounting part including a mounting plane parallel with the bonding surface of the lens and a through hole that perpendicularly passes through the bonding surface of the lens and the mounting plane of the mounting part.

12. The method of claim 9, wherein:

each of the bonding surface of the lens, the bonding surface of solid state imaging element, and the bonding surface of the intermediary supporting member are flat.

13. The method of claim 12, further comprising:

placing the bonding surface of the lens parallel to an optical axis of the lens, and placing the bonding surface of the solid state imaging element perpendicular to the optical axis of the lens.

14. The method of claim 9, wherein the step of hardening the adhesives includes using an adhesive that becomes rigid in response to ultraviolet light.

15. The method of claim 14, wherein the step of hardening the adhesives includes using an intermediary supporting member that passes the ultraviolet light.

16. A method of fixing a lens and a solid state imaging element to be placed in a predetermined position relative to the lens, the method comprising:

grasping the lens and the solid state imaging element and positioning the solid state imaging element in the predetermined position relative to the lens;

hardening adhesives placed between bonding surfaces of the lens and the solid state imaging element and a bonding surface of an intermediary supporting member that is in a free condition in a state that the solid state imaging element and the lens are maintained in respective positions after the solid state imaging element has been positioned in the predetermined position relative to the lens, wherein the intermediary supporting member in the free condition is supported by respective surface tensions of the adhesives placed between the boding surfaces of lens, the solid state imaging element, and the intermediary supporting member, and wherein the step of hardening the adhesives includes using an adhesive that becomes rigid in response to ultraviolet light.

17. The method of claim 16, wherein the step of hardening the adhesives includes using an intermediary supporting member that passes the ultraviolet light.

18. A structural unit comprising:

a lens configured to form an optical image;

a solid state imaging element placed in a predetermined position relative to the lens; and an intermediary supporting member configured to be bonded and fixed to each of the lens and the solid state imaging element by an adhesive so that the lens and the solid state imaging element are integrated with each other in a state that a positional relation between the lens and the solid state imaging element is maintained, wherein the adhesive becomes rigid in response to ultraviolet light.

19. The structural unit of claim 18, wherein the intermediary supporting member passes the ultraviolet light.

\* \* \* \* \*